(12) United States Patent
Tsuruta et al.

(10) Patent No.: US 9,796,378 B2
(45) Date of Patent: Oct. 24, 2017

(54) VEHICLE TRAVEL PATH GENERATING APPARATUS

(71) Applicant: DENSO CORPORATION, Kariya, Aichi-pref. (JP)

(72) Inventors: Tomohiko Tsuruta, Aichi-ken (JP); Yusuke Ueda, Nishio (JP); Takeshi Hatoh, Nagoya (JP); Takayuki Kondoh, Kuwana (JP); Naoya Inoue, Aichi-ken (JP); Hossein Tehrani Niknejad, Obu (JP); Seiichi Mita, Sagamihara (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 106 days.

(21) Appl. No.: 14/154,561

(22) Filed: Jan. 14, 2014

(65) Prior Publication Data

US 2014/0200801 A1 Jul. 17, 2014

(30) Foreign Application Priority Data

Jan. 16, 2013 (JP) ................................. 2013-005562

(51) Int. Cl.
*B60W 30/00* (2006.01)
*B60W 30/08* (2012.01)
(Continued)

(52) U.S. Cl.
CPC ............ *B60W 30/00* (2013.01); *B60W 30/08* (2013.01); *B60W 30/10* (2013.01); *B60W 30/12* (2013.01);
(Continued)

(58) Field of Classification Search
None
See application file for complete search history.

(56) References Cited

U.S. PATENT DOCUMENTS

2007/0219720 A1* 9/2007 Trepagnier ............ B60W 30/00
701/300
2009/0030613 A1* 1/2009 Kataoka ................. G08G 1/167
701/300
(Continued)

FOREIGN PATENT DOCUMENTS

JP 2006-154967 6/2006
JP 2011-514580 A 5/2011
(Continued)

OTHER PUBLICATIONS

Do, Q. et al, "Safe Path Planning among Multi Obstacles", Intelligent Vehicles Symposium (IV); Jun. 2011, pp. 332-338.

*Primary Examiner* — John R Olszewski
*Assistant Examiner* — James M McPherson
(74) *Attorney, Agent, or Firm* — Harness, Dickey & Pierce, P.L.C.

(57) ABSTRACT

When a travel path is to be generated for a vehicle, road surface lines (white lines, etc.) delimiting the traffic lane of the vehicle, and also external objects in the vehicle environment, are detected and registered as respective obstacles. Specific points are defined at appropriate locations on each obstacle, and the travel path is generated by connecting respective mid-point positions between opposed pairs of specific points, each pair defined on respective ones of an opposed (left-side, right-side) pair of the registered obstacles.

12 Claims, 9 Drawing Sheets

(51) Int. Cl.
*B60W 30/10* (2006.01)
*B60W 30/12* (2006.01)

(52) U.S. Cl.
CPC ..... *B60W 2550/00* (2013.01); *B60W 2550/10* (2013.01)

(56) References Cited

U.S. PATENT DOCUMENTS

| | | | |
|---|---|---|---|
| 2010/0023251 A1* | 1/2010 | Gale | G01C 21/00 701/533 |
| 2010/0324797 A1 | 12/2010 | Fritz | |
| 2011/0205042 A1* | 8/2011 | Takemura | G08G 1/166 340/435 |
| 2012/0044265 A1* | 2/2012 | Khorashadi | G01C 21/206 345/641 |
| 2012/0053755 A1 | 3/2012 | Takagi | |
| 2012/0065841 A1* | 3/2012 | Nagata | B60W 50/06 701/36 |
| 2012/0072050 A1* | 3/2012 | Naka | B60W 30/09 701/1 |
| 2012/0166147 A1* | 6/2012 | Kwak | G06T 11/60 703/1 |
| 2013/0226409 A1* | 8/2013 | Akiyama | B60W 10/184 701/41 |
| 2013/0321172 A1* | 12/2013 | Igarashi | G08G 1/166 340/905 |
| 2014/0163928 A1* | 6/2014 | Kalai | G06F 17/509 703/1 |

FOREIGN PATENT DOCUMENTS

| | | |
|---|---|---|
| JP | 2012-048642 | 3/2012 |
| JP | 2012-153324 A | 8/2012 |

\* cited by examiner

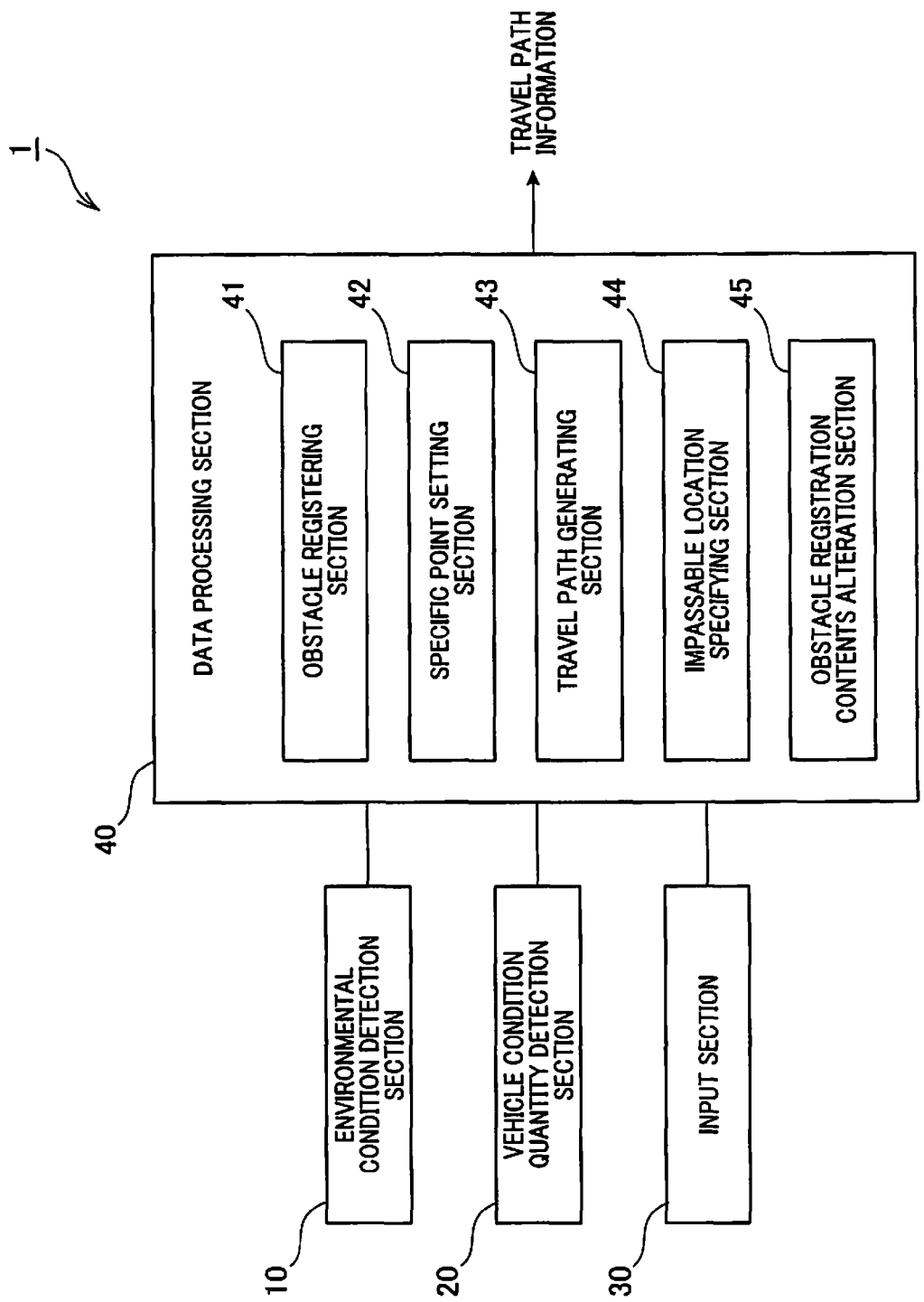

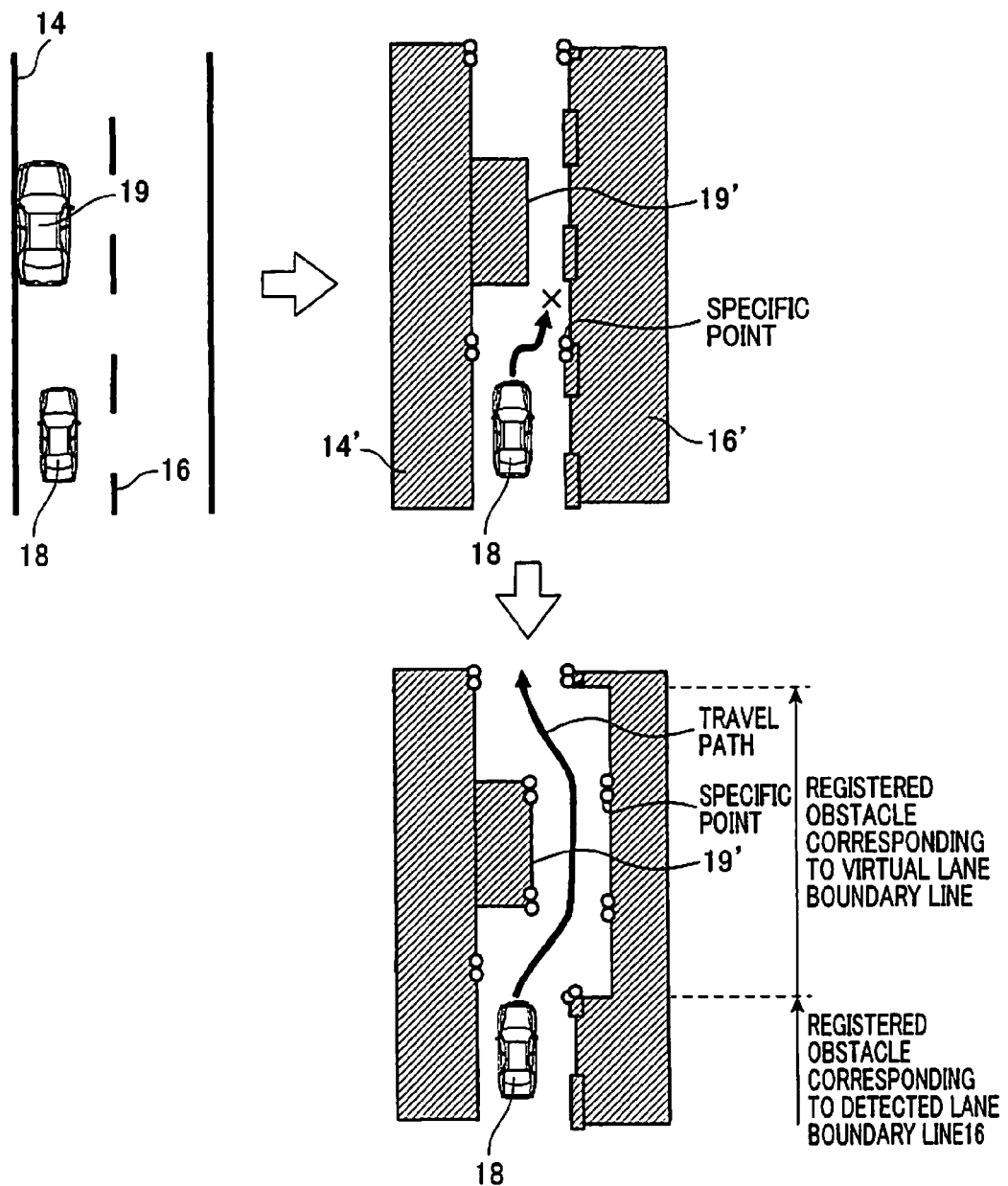

VEHICLE TRAVEL PATH GENERATING APPARATUS

CROSS-REFERENCE TO RELATED APPLICATIONS

This application is based on and incorporates herein by reference Japanese Patent Publication No. 2013-5562 filed on Jan. 16, 2013.

BACKGROUND OF THE INVENTION

Field of Application

The present invention relates to an apparatus for generating a travel path for a vehicle. In particular the invention relates to an apparatus which generates a travel path that can be traveled over by smoothly varying the vehicle steering, while avoiding obstacles, but which requires only extremely small amounts of computation.

Description of Related Art

Technology has been proposed hitherto, for example as described in Japanese Patent Publication No. 2006-154967 (page 12, FIG. 11) for an apparatus whereby the travel path of a vehicle is laid out on a grid, formed of equidistant lines arrayed in X and Y directions. Specifically, a plurality of possible travel paths are calculated, and the path having minimum risk is then calculated.

However with such an apparatus, in order to avoid obstacles while performing smooth steering of the vehicle, it is necessary to make the grid extremely detailed, with very small spacings between the grid lines. As a result, large amounts of computation are required, so that a large-scale data processing apparatus is required and computation times become long.

SUMMARY OF THE INVENTION

Hence it is desired to overcome the above problem, by providing a vehicle travel path generating apparatus, for installation on a host vehicle, which generates a travel path to be traversed by the host vehicle, whereby obstacles are safely avoided while only smooth variations of the vehicle steering angle are performed, but which requires only small amounts of computation to be performed.

To achieve this, the vehicle travel path generating apparatus includes, at least, lane boundary line recognition means, obstacle registering means, specific point setting means, and travel path generating means.

The lane boundary line recognition means serves to identify a specific pair of lane boundary lines appearing on the road surface ahead of the host vehicle, delimiting a traffic lane in which the host vehicle is to travel. The obstacle registering means serves to specify and register that specific pair of lane boundary lines as respective obstacles (effectively, to specify these lane boundary lines as respective limits of regions which must not be entered by the host vehicle and which respectively extend to the right and to the left of the host vehicle traffic lane).

The specific point setting means serves to set specific points as respective positions on the registered obstacles. These are positions (such as corner positions) which must be particularly be avoided by the host vehicle for safely passing between each opposed pair of the obstacles or driving between lane boundary lines. The travel path generating means serves to generate the required travel path, as a smooth curve which connects successive mid-point positions or other inter-point positions between opposing pairs of the specific points (i.e., each pair being located on respective ones of an opposed pair of registered obstacles).

The travel path generation apparatus preferably further comprises object detection means, for detecting objects or apparent objects (i.e., road surface markings other than lane boundary lines) in the environment of the host vehicle, and, for obtaining position information and external dimension information for each detected object. Based on that information, the obstacle registering means registers the detected objects as respective obstacles.

Preferably, in place of an object that is detected as constituting an obstruction, the obstacle registering means registers a corresponding virtual object as an obstacle, where the virtual object has larger external dimensions than those of the detected object. In that case, the extent to which the dimensions of the virtual object are increased (relative to those of the detected object) is preferably determined in accordance with the type of the corresponding detected object, e.g., automobile, bicycle, motor cycle, pedestrian, etc.

From another aspect, the travel path generation apparatus may be configured advantageously whereby, when the user supplies a command for designating that a specific object (which has been registered as an obstacle) is to be driven over, the registration of the obstacle is deleted from the obstacle registering means. A travel path can then be generated whereby the object concerned (e.g., which may be a small solid object or a marking on the road surface) is driven over by the host vehicle.

Furthermore the apparatus is advantageously configured whereby, when an impassable pair of registered obstacles consist of an actual object and a lane boundary line, and the registration of the lane boundary line is deleted (in response to a command from the user to drive over the lane boundary line) a virtual lane boundary line is then established. The virtual lane boundary line is spaced apart from the actual opposed object sufficiently to enable the host vehicle to pass between them.

In that way it becomes possible for the host vehicle to temporarily depart from its traffic lane while following the generated travel path, but only on condition that permission has been obtained from the user.

The virtual lane boundary line is preferably positioned in accordance with the type of the opposed object and/or in accordance with a condition quantity (e.g., speed) of the host vehicle.

When it is judged that the travel path is obstructed by an impassable opposed pair of registered obstacles, it is possible that the user may observe a preceding vehicle which is succeeding in avoiding the obstacles (e.g., by running over one of the obstacles, when that is a road surface marking). The travel path generation apparatus may further be configured whereby in such a case, when the user supplies a command designating that the preceding vehicle is to be followed, the apparatus deletes the registration of the one of the obstacles (e.g., a lane boundary line) which is the closer of the two obstacles to the preceding vehicle. A path which traverses the obstruction location can then be generated and applied.

BRIEF DESCRIPTION OF THE DRAWINGS

FIG. 1 is a block diagram showing the basic configuration of an embodiment of a travel path generation apparatus;

FIG. 2A to FIG. 6 are respective conceptual diagrams for use in describing path generation that is executed by the embodiment;

DESCRIPTION OF PREFERRED EMBODIMENTS

1. Overall Description of Embodiment

Figure 2A:
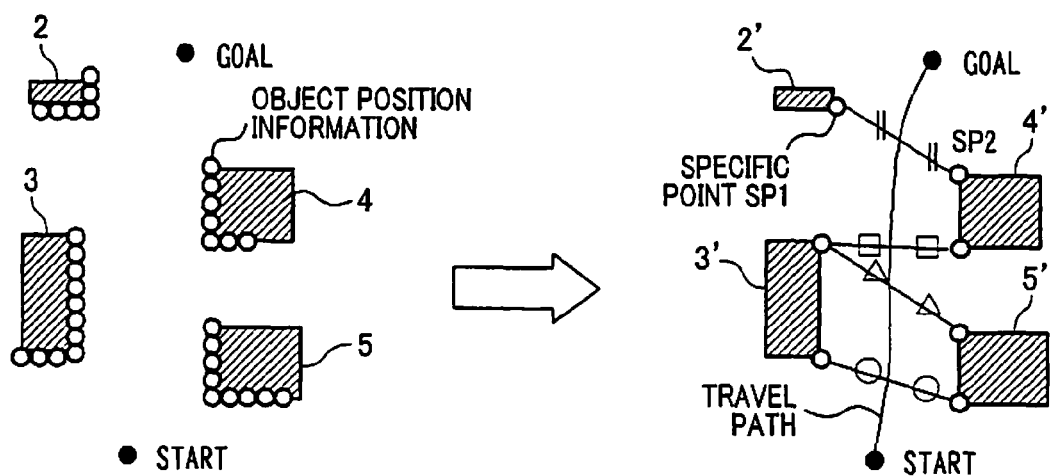

The overall configuration of an embodiment, designated as the travel path generating apparatus 1, is shown in block diagram form in FIG. 1. The travel path generating apparatus 1 is installed on a vehicle referred to as the host vehicle in the following. As shown, the travel path generating apparatus 1 is made up of an environmental condition detection section 10, a vehicle condition quantity detection section 20, an input section 30 and a data processing section 40. The environmental condition detection section 10 detects specific environmental conditions of the vehicle, and in particular, detects objects and road surface markings, for thereby detecting regions to be avoided by the host vehicle. The vehicle condition quantity detection section 20 detects values expressing conditions of the vehicle such as the vehicle speed, etc. The input section 30 is made up of various input devices which enable the user (i.e., the driver of the host vehicle) to input commands, or the host vehicle to automatically input commands in an autonomous or semi-autonomous driving mode, to the travel path generating apparatus 1. The data processing section 40 executes various types of calculation and data processing.

1.1 Configuration of Environmental Condition Detection Section 10

The environmental condition detection section 10 is made up of a forward-direction sensor, a left-side sensor and a right-side sensor. Here, the term "forward-direction sensor" signifies an apparatus such as cameras (having a single image sensor, or stereo system) or a laser radar apparatus which detects external features within a specific angular range centered on the forward direction of the vehicle. The term "left-side sensor" and "right-side sensor" signifies an apparatus such as cameras (having a single image sensor, or stereo system) or laser radar apparatus. The left-side sensor detects external features within an angular range centered on the width direction of the vehicle, oriented leftward. The right-side sensor similarly detects external features within an angular range centered on the width direction of the vehicle, oriented rightward.

However it could equally be possible to perform all of the functions of the forward-direction sensor, the left-side sensor and the right-side sensor in common by a single apparatus such as a camera apparatus, configured to perform the necessary detection operations within the required area.

Information obtained by the environmental condition detection section 10 concerning external objects and road surface markings, etc., is referred to as "target" information, as a general term.

1.2 Configuration of Vehicle Condition Quantity Detection Section 20

The vehicle condition quantity detection section 20 includes a steering angle encoder and a vehicle speed encoder. The steering angle encoder is a sensor which detects the steering angle currently set for the host vehicle, as a running condition quantity of the host vehicle, and outputs a signal in accordance with the steering angle to the data processing section 40. The vehicle speed encoder is a sensor which detects the current speed of the host vehicle as a running condition quantity, and outputs a signal in accordance with the detected speed to the data processing section 40.

There is no particular limitation on the types of device used as the steering angle encoder or vehicle speed encoder, and any known types of device may be employed. Furthermore it may alternatively be possible to use a satellite navigation apparatus such as a GPS apparatus for detecting the vehicle speed.

1.3 Configuration of Data Processing Section 40

The data processing section 40 is made up of an obstacle registration section 41, a specific point setting section 42, a travel path generating section 43, a impassable location specifying section 44 and a obstacle registration contents alteration section 45. The data processing section 40 is implemented as a microcomputer, having a CPU, ROM, RAM, I/O interface, etc. The respective functions of the obstacle registration section 41, specific point setting section 42, travel path generating section 43, impassable location specifying section 44 and obstacle registration contents alteration section 45 are performed by the data processing section 40 in executing a control program which is held in the RAM or ROM.

2 Path Generation Processing

The basic features of path generation processing will be described referring first to the simple conceptual diagram of FIG. 2A, in which it is required to generate a travel path from an initial position (START) to a final position (GOAL). It is assumed that (for the host vehicle to remain within its traffic lane) the travel path must pass between two opposed pairs of currently detected objects (the opposed pair 2, 4 and the opposed pair 3, 5), disposed respectively to the right and left of the center line of the traffic lane. Object position information which is detected by the environmental condition detection section 10 for these objects is indicated by the lines of small circles. The detected objects have been registered as respective obstacles 2', 3', 4' and 5' in the obstacle registration section 41. To generate the travel path, specific points (specific positions on each of the objects that have been registered as obstacles) are extracted from the object position information as described hereinafter. A travel path is generated by connecting successive mid-point positions between each opposed pair of (left-side, right-side) specific points, e.g., between the specific points SP1, SP2 shown in FIG. 2A, applying curvilinear interpolation to obtain a smoothly curving travel path. Thus, the separation distances between the specific points in each of these opposed pairs constitute the distances between the boundaries of the generated travel path.

When the positions of the specific points are appropriately determined (optimized), these distances between the path boundaries are maximized, while the host vehicle is able to pass unobstructed between each of successive opposed pairs of obstacles, along the travel path.

Figure 2B:
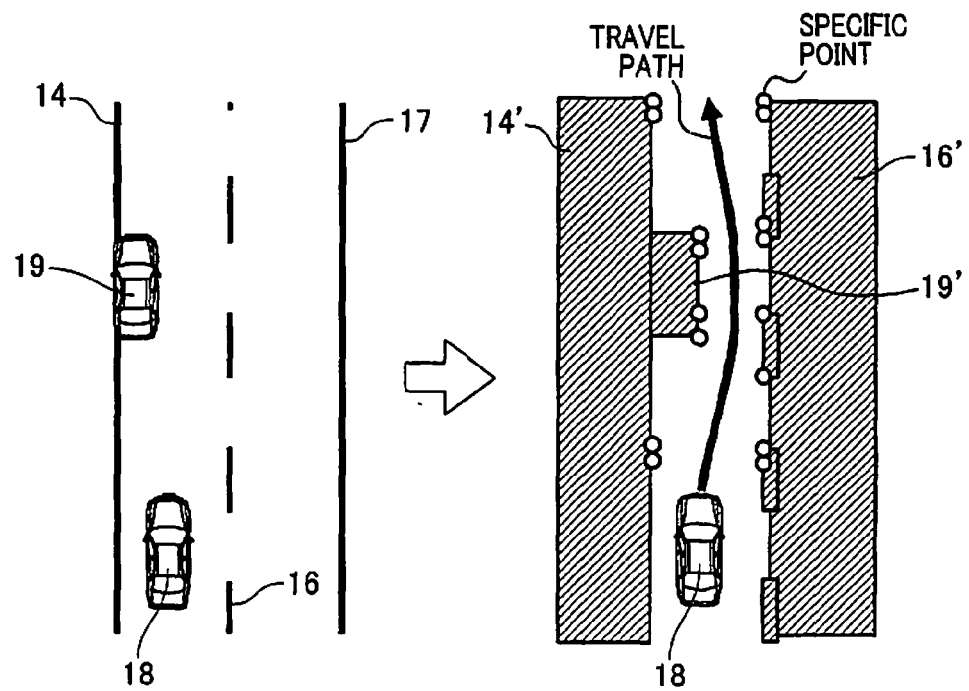

FIG. 2B shows a case in which a host vehicle 18 travels on a travel lane delimited by a left-side lane boundary line 14 (continuous white line) a far right-side lane boundary line 17 and right-side lane boundary line 16 (successive white or yellow line segments). A stationary vehicle 19 is within the traffic lane of the host vehicle 18. The obstacle registration section 41 registers a region extending leftward from the left-side boundary line 14 as an obstacle 14', registers a region extending rightward from the right-side lane boundary line 16 as an obstacle 16', and registers the stationary vehicle 19 as an obstacle 19', as illustrated. The travel path is generated as described above referring to FIG. 2A, connecting successive mid-points between opposed pairs of specific points, located on the obstacles 14', 16' and 19' as shown in FIG. 2B.

The path generation processing performed by the travel path generating apparatus 1 (as driving support processing or for implementing an autonomous or semi-autonomous driving mode) will be described referring to the flow diagram of FIGS. 7A and 7B. This shows a processing routine which is executed by the data processing section 40 for generating a travel path as the host vehicle is driven along a road.

Firstly, in step S110, updated target information is obtained from the detection results of the environmental condition detection section 10. If the forward-direction sensor of the environmental condition detection section 10 detects a pair of straight lines or curved lines (formed on the road surface) which extend directly ahead of the host vehicle, these are recognized as the lane boundary lines of the traffic lane of the host vehicle. A lane boundary line may consist of a road center line (as in FIG. 2B), an outer edge line of a road, a traffic lane delimiting line, etc., and in general is white or yellow in color.

In addition, based on detected target information (position, length along the direction of the traffic lane, etc.) obtained for each of the lane boundary lines, these are registered as respective obstacles (as described above referring to FIG. 2B) in the obstacle registration section 41.

Step S120 is then executed, to obtain updated target information on external features other than the traffic lane of the host vehicle, from the environmental condition detection section 10. This includes information obtained as detection results from the left-side sensor and right-side sensor of the environmental condition detection section 10, and concerns objects which are detected as being within or outside (adjacent to) the traffic lane. Such objects may consist of stationary vehicles, traffic cones, etc., buildings or terrain features which partially obstruct the traffic lane, etc.

Figure 5:
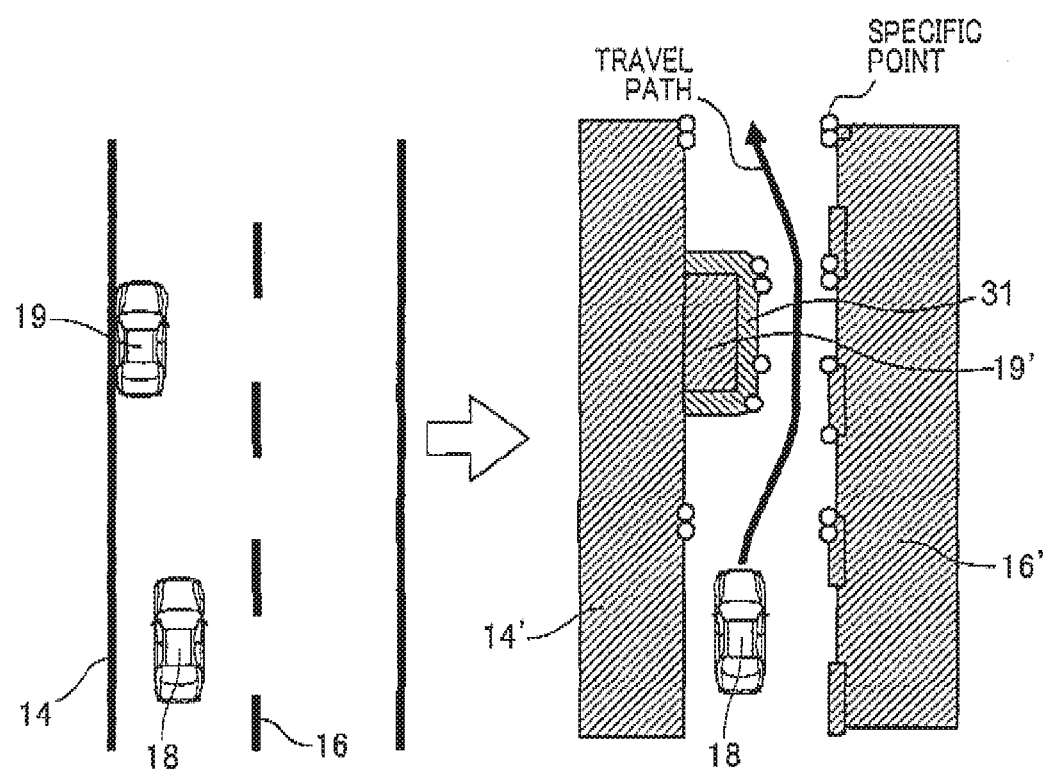

Based on the target information thus acquired for each object that is judged to constitute an obstacle, i.e., object position information expressing the height, length (as measured along the direction of the traffic lane), width (as measured at right angles to the direction of the traffic lane) and position, these objects are registered in the obstacle registration section 41 as respective obstacles. Preferably, in place of such a detected object, a corresponding virtual obstacle is registered by the obstacle registration section 41. The virtual obstacle is made larger than the actually detected object, to an extent determined by the type of object, e.g., stationary automobile, bicycle, etc. This is illustrated in FIG. 5, in which a stationary vehicle 19 is registered by the obstacle registration section 41 as a virtual obstacle 31 of larger size, rather than as an obstacle 19' which is of corresponding size to the vehicle 19.

Next in step S130, a decision is made as to whether a travel path can be generated which avoids the obstacles that are currently registered, while maintaining the host vehicle within its traffic lane. For example referring to FIG. 5, this will be the case if the separation between the virtual obstacle 30 and the opposing obstacle (right-side lane boundary line) exceeds the width of the host vehicle. If it is judged that all of the obstacles that are currently detected can be avoided (YES in step S130), step S260 is then executed, while otherwise (NO in step S130) step S140 is then executed.

In step S140 a decision is made as to whether the host vehicle would be able to pass through an opposed pair of obstacles (judged to be unavoidable in step S130) by riding over one of these obstacles. If that is judged to be possible (YES in step S140) step S150 is then executed, while otherwise (NO in step S140), step S180 is then executed.

Figure 4:
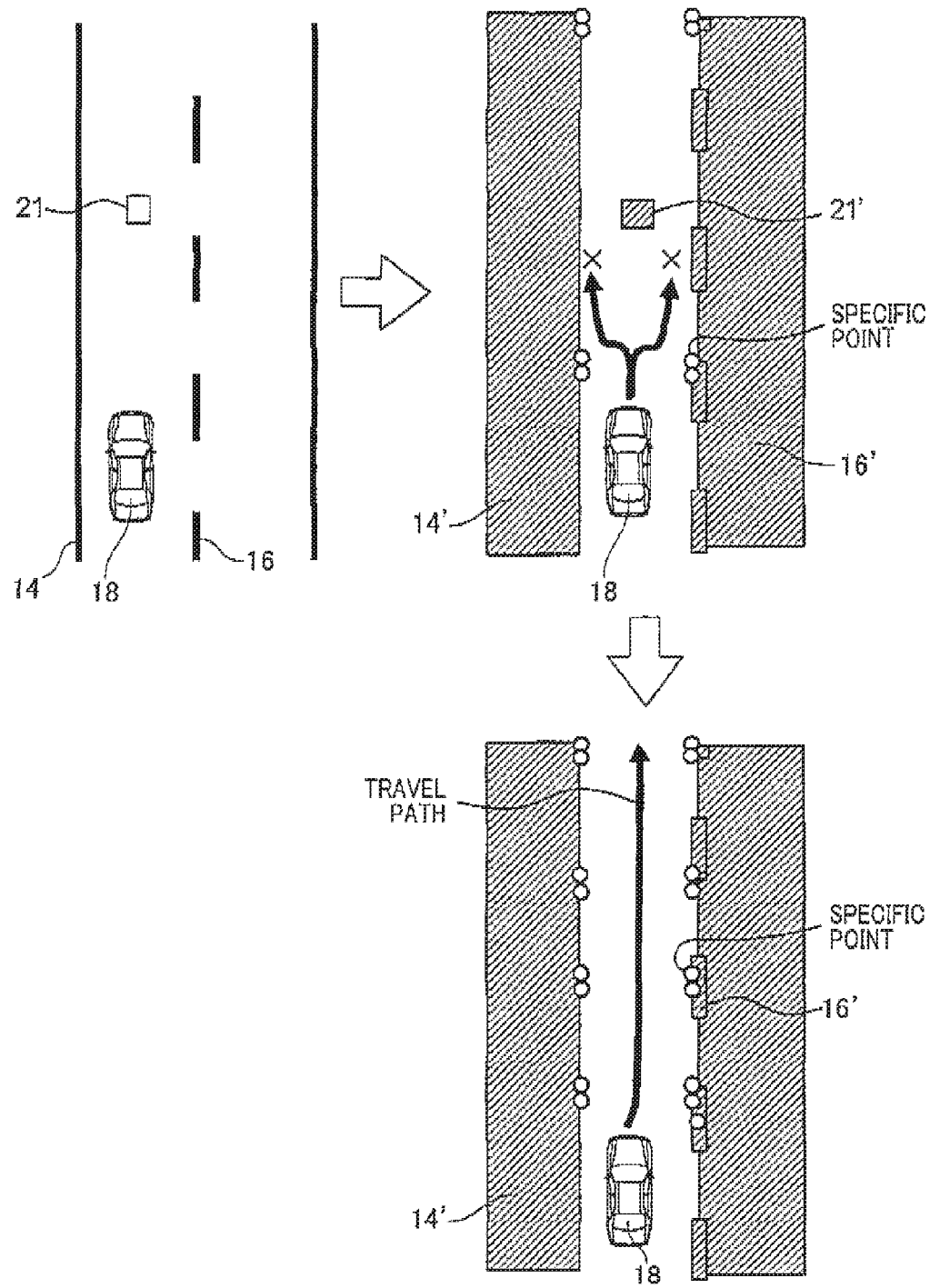

FIG. 4 illustrates an example in which a fallen object 21, 21' on the road surface is obstructing the travel path, but in which it is judged (based on the target information obtained for the object 21, 21') that the object can safely driven over by the host vehicle 18. This would allow the host vehicle to then pass without obstruction.

Hence in step S150, a query is sent to the vehicle driver (by generating a visual or audible indication, using an apparatus not shown in the drawings) or to the autonomous or semi-autonomous control system as to whether a detected obstacle is to be driven over. The resultant response command from the user or autonomous or semi-autonomous control system is received via the input section 30. If this command specifies that the obstacle is not to be driven over (NO in step S150), step S180 is then executed, while if the user confirms that the obstacle is to be driven over (YES in step S150), step S160 is then executed.

In step S160, the registration of the object that can be driven over as an obstacle is deleted from the obstacle registration section 41, i.e., that object is no longer recognized as an obstacle.

Following step S160, step S170 is executed in the same manner as for step S130. This is done to confirm that (when the object in question has been deleted as a registered obstacle), remaining obstacles can then be avoided while maintaining the host vehicle within its traffic lane. If such other obstacles can be avoided (YES in step S170), operation proceeds to step S260, while otherwise (NO in step S170) step S180 is then executed.

Step S180 is executed when it has been judged in step S140, 150 or S170 that an obstacle or obstacles cannot be avoided while maintaining the host vehicle within its traffic lane. In step S180, a decision is made as to whether a vehicle is detected as preceding the host vehicle, and if so, whether the preceding vehicle is being steered such as to avoid the obstacles which have been judged to be unavoidable. If that is the case (YES in step S180), step S190 is then executed. If there is no preceding vehicle detected, or there is such a preceding vehicle but it does not avoid the obstacles (NO in step S180), operation proceeds to step S210.

Figure 6:
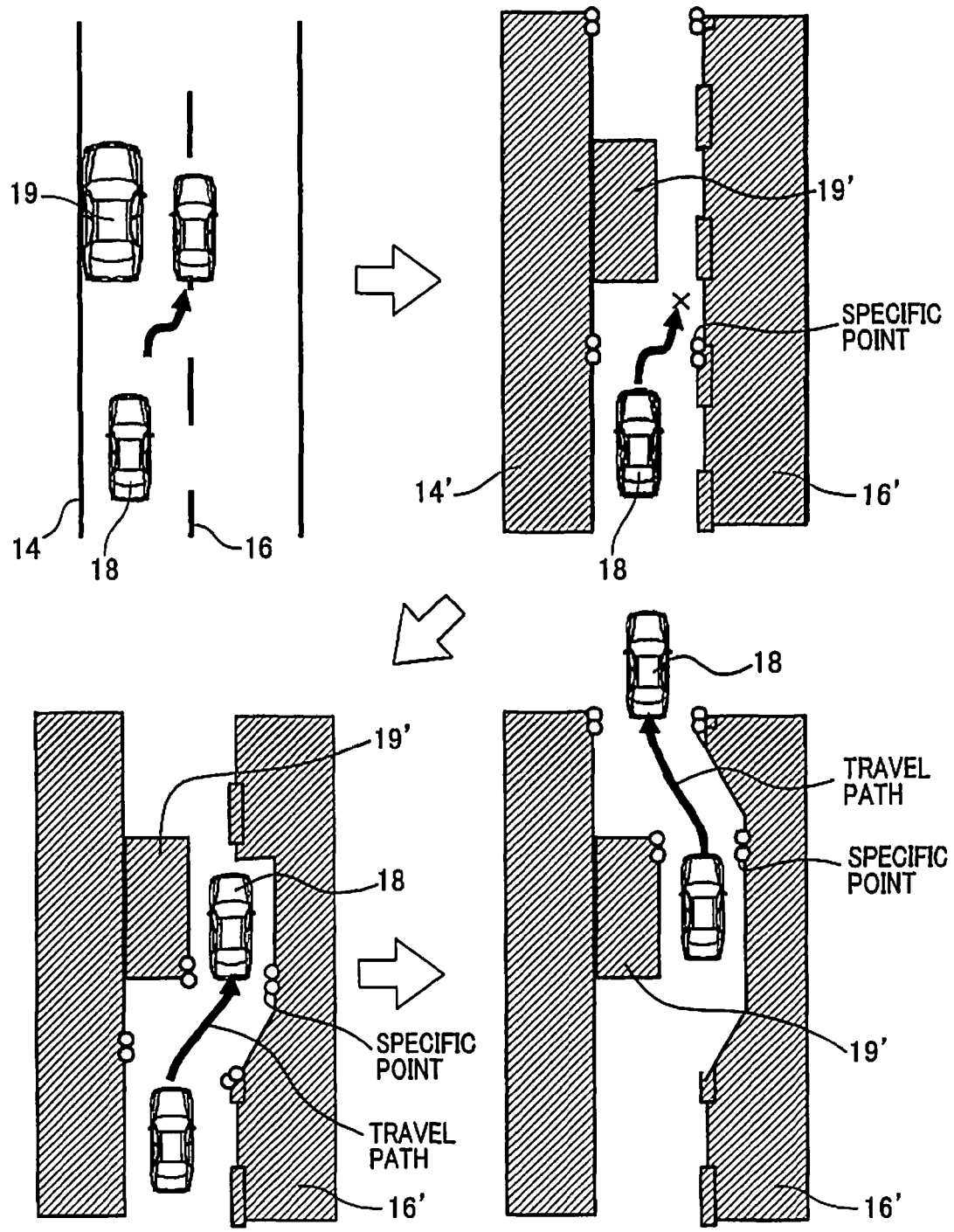

It is to be understood that (in the broad sense in which the term "avoid an obstacle(s)" is used in this description), a preceding vehicle may avoid an opposed pair of obstacles (i.e., objects or road surface marking which have been registered as obstacles in the obstacle registration section 41) by running over one of these obstacles. In the example of FIG. 6, a preceding vehicle 40 avoids a stationary object (parked vehicle 19) by driving over the right-side lane boundary line 16, which has been registered as an obstacle 16'.

In step S190, a query is made to the user or autonomous or semi-autonomous control system as to whether the host vehicle is to follow the path steered by the preceding vehicle to avoid the obstacle. The resultant response command from the user is received via the input section 30.

If the user or autonomous control system confirms that the preceding vehicle is to be followed (YES in step S190) operation proceeds to S200, while otherwise (NO in step S190) step S210 is then executed.

In step S200, the obstacle registration section 41 deletes the registration of the obstacle that is avoided by the preceding vehicle. Step S230 is then executed.

In step S210, with respect to obstacle(s) judged to be unavoidable in the preceding decision steps S140 and S170, and not detected as being avoided by a preceding vehicle in step S180, a query is made to the user or autonomous control system as to whether the obstacle(s) are to be avoided by driving over a lane boundary line (e.g., as in the example of FIG. 3). The resultant command from the user or autonomous control system is received via the input section 30.

If the user or autonomous control system confirms that the obstacle is be avoided by driving over a lane boundary line (YES in step S210), step S220 is then executed, while otherwise (NO in step S210) operation proceeds to step S240.

In step S220, all registered obstacles which are outside the traffic lane of the host vehicle, beyond the lane boundary line that is to be driven over, are deleted from registration, and that lane boundary line is also deleted from registration as an obstacle in the obstacle registration section 41.

A virtual lane boundary line is then generated, at a position whereby the host vehicle can pass between that virtual lane boundary line and the obstacle which is in the traffic lane of the host vehicle. The virtual lane boundary line is then registered as an obstacle in the obstacle registration section 41.

In that way, in the example of FIG. 3, the travel path can pass over an actual lane boundary line 16, thereby enabling the host vehicle to pass an object (stationary vehicle) 19 is blocking its traffic lane. The position and length of the virtual lane boundary line may be determined based on the type of the object (e.g., automobile, bicycle, motor cycle, pedestrian, etc.) that is within the traffic lane and is to be avoided, and in accordance with the steering angle and speed of the host vehicle, as detected by the vehicle condition quantity detection section 20.

Next in step S230, a decision is made as to whether (after executing step S200 or S220) all remaining obstacles can be avoided. If an obstacle(s) still cannot be avoided (NO in step S230), step S240 is then executed, while otherwise (YES in step S230) operation proceeds to step S260.

Figure 7A:
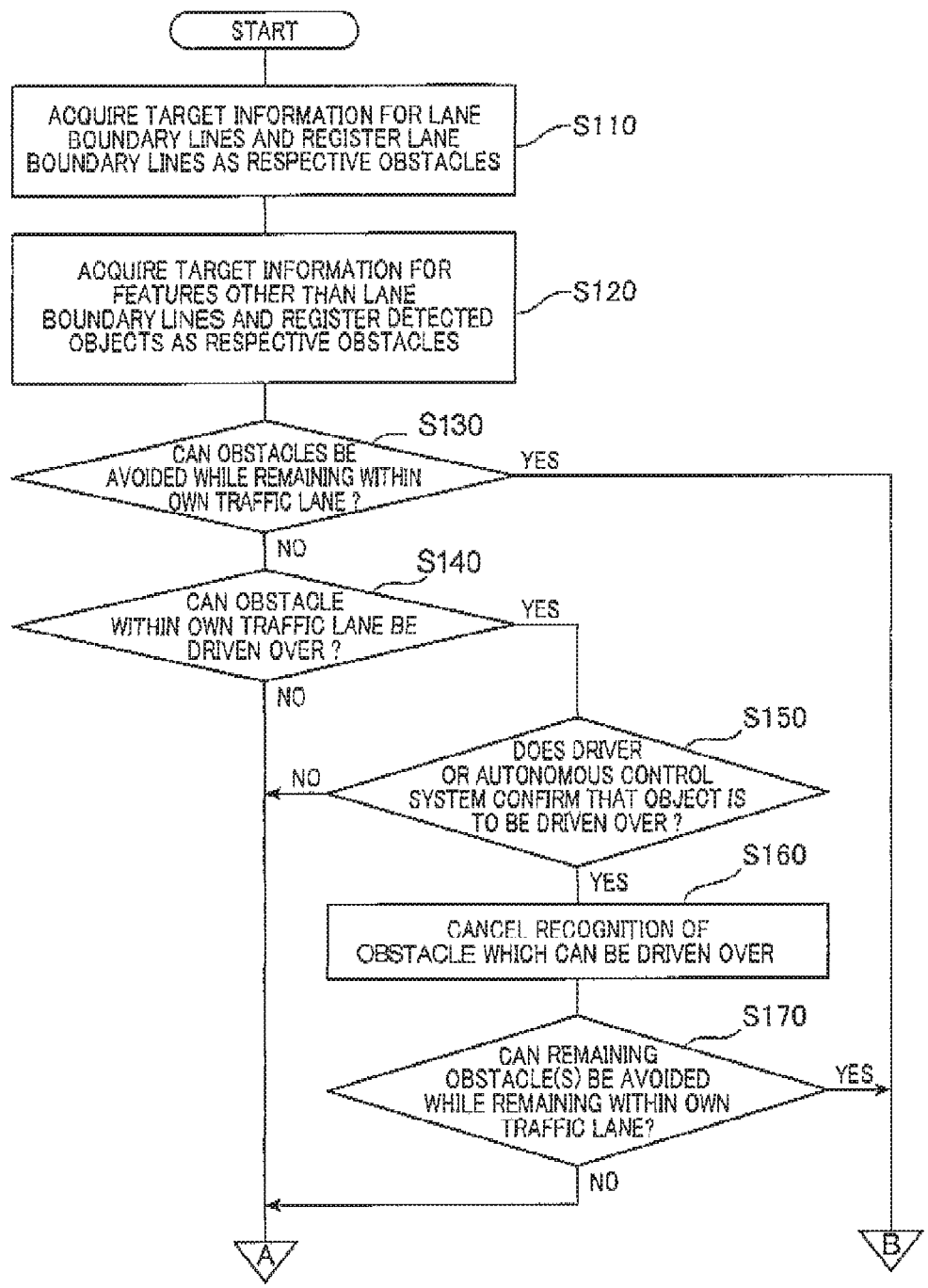
FIGS. 7A and 7B are a flow diagram of a path generation processing routine that is executed by the embodiment.
Figure 7B:
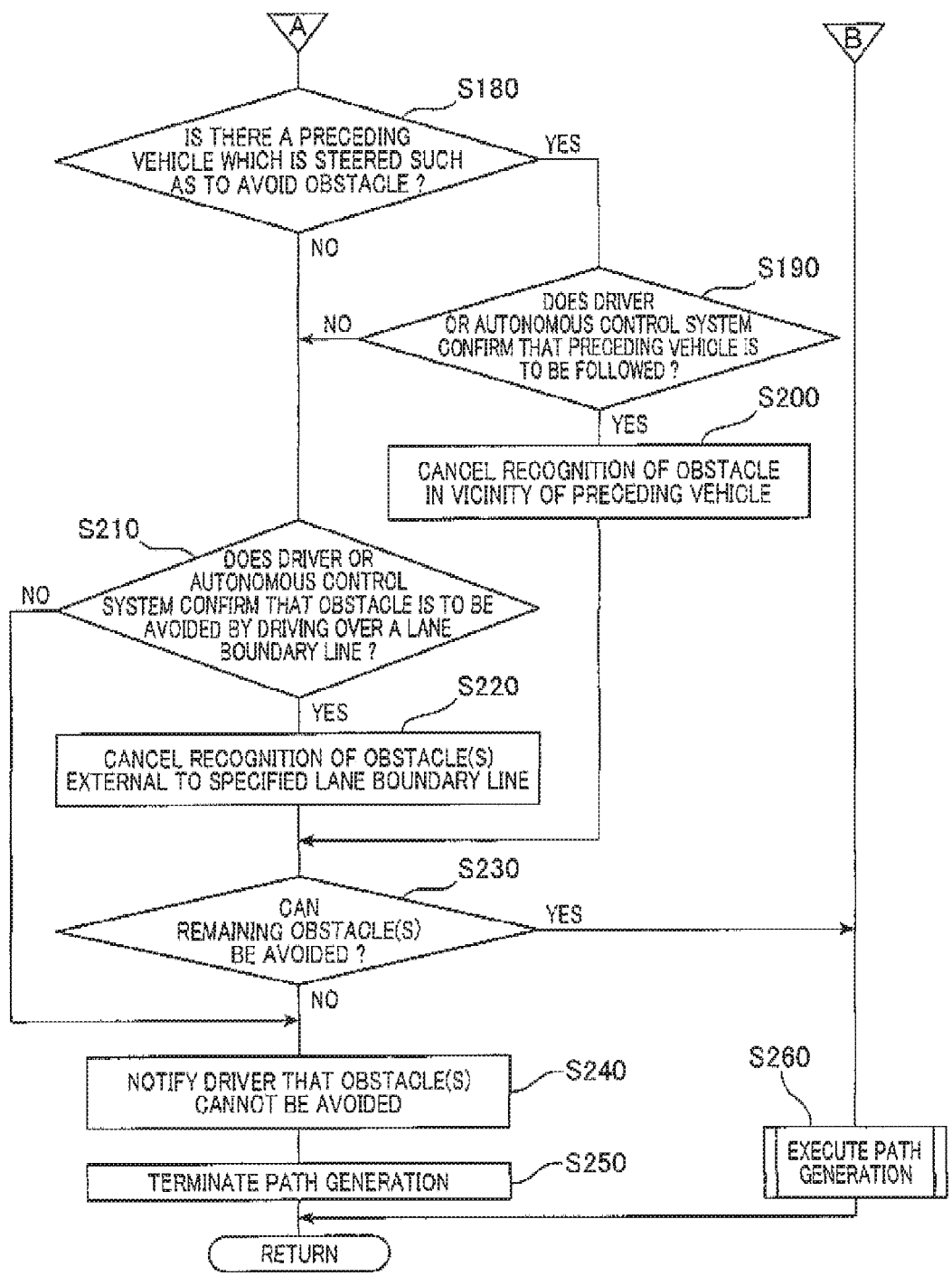

Upon completion of step S260 this execution of the processing of FIGS. 7A and 7B is ended.

However if step S240 is executed, an indication is given to the user or autonomous control system that there are obstacles which cannot be avoided, and operation proceeds to step S250. In step S250, travel path generation processing is terminated.

Figure 8:
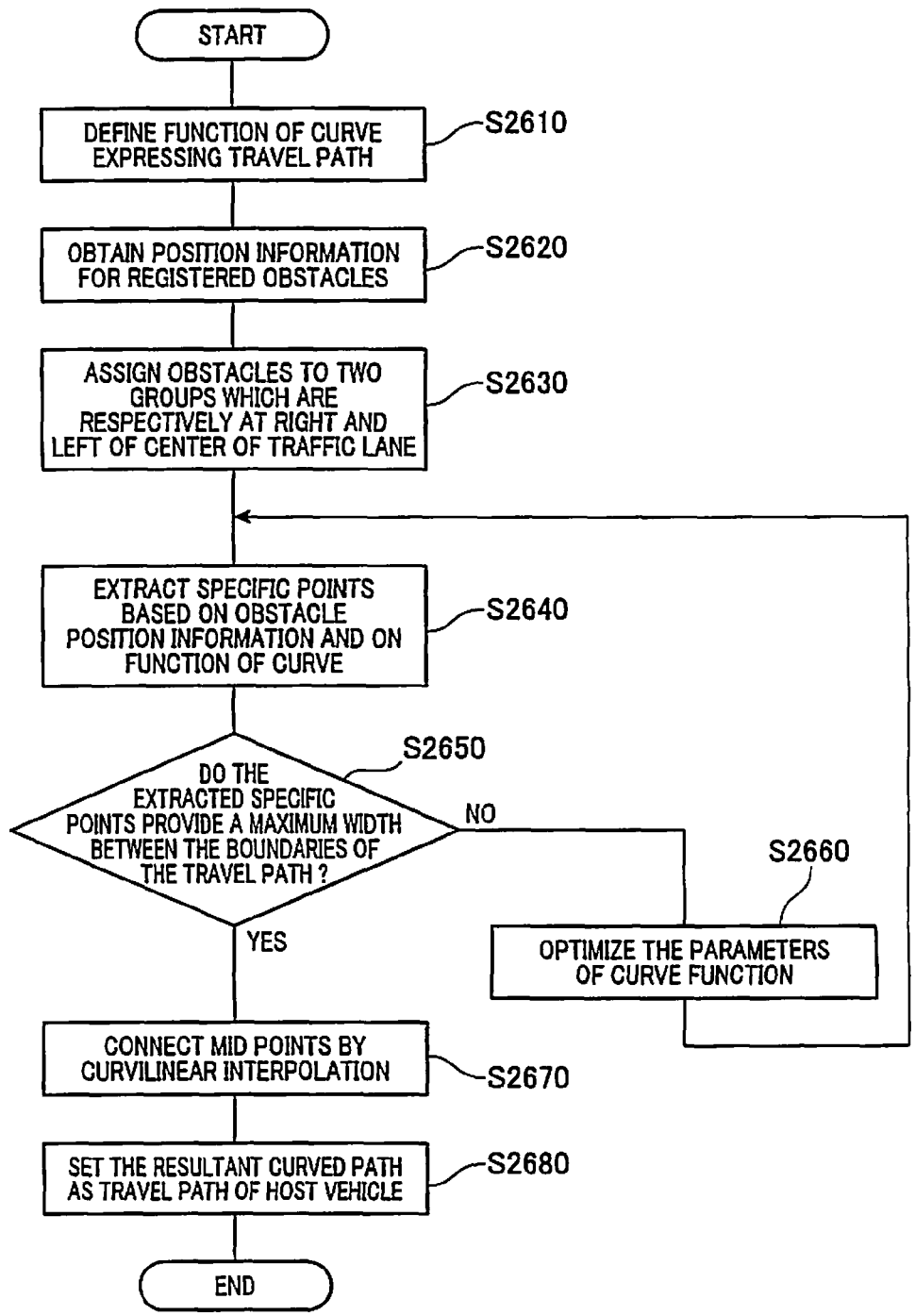
FIG. 8 shows details of a subroutine executed in the processing of FIG. 7B.

The contents of step S260 (travel path generation subroutine) are shown in FIG. 8.

Firstly in step S2610 a function of a curve is defined, for expressing the form of the travel path. Next in step S2620, object position information (as illustrated in FIG. 2A) is obtained from the obstacle registration section 41, for each of the objects which are currently registered as obstacles. These obstacles are then (step S2630) separated into two groups, located respectively to the right and left of center of the traffic lane of the host vehicle.

Next in S2640, specific points are extracted from the object position information for these obstacles. This is done in accordance with the function of the curve expressing the path and values assigned to parameters of the function.

The travel path generating section 43 then generates a travel path (i.e., as a candidate travel path) which connects successive mid-point positions or other inter-point positions between pairs of opposing specific points (each pair located on a right-side obstacle and an opposing left-side obstacle respectively, as described above).

Following step S2640, in step S2650, a decision is made as to whether the extracted specific points provide a maximum width of the travel path boundaries (i.e., determined by the separation distances between specific points on opposed obstacles, such as between the specific points SP1 and SP2 in FIG. 2A). If that condition is met, the impassable location specifying section 44 then judges whether there is any position along the candidate travel path at which the width of the host vehicle is greater than the separation distance between an opposed pair of obstacles. If there is no such obstruction position, then in addition, processing may be executed to locate any position(s) where the separation distance between an opposed pair of obstacles width exceeds the vehicle width by at least a specific margin.

If it is judged that the extracted specific points provide maximum width of the travel path (maximum separation between path boundaries) and there is no position at which the host vehicle cannot pass between an opposed pair of obstacles, a YES decision is made in step S2650 and step S2670 is then executed. Otherwise (NO decision in step S2650), step S2660 is then executed.

In step S2660 the function parameters are adjusted, then step S2640 is returned to. A statistical classification method such as a support vector machine (SVM) or margin classifier or clustering method may be used to perform such adjustment, for optimizing the function parameters through successive executions of step S2660.

In step S2670, curvilinear interpolation is performed between the points (midway positions between opposed pairs of specific points) defining the travel path determined in step S2650, as illustrated in FIG. 2A, and the result is set (step S2680) as the travel path for the host vehicle. This execution of the subroutine of FIG. 8 is then ended.

3. Effects Obtained

With the above embodiment, a travel path can be calculated which enables obstacle to be avoided while smoothly steering the host vehicle, but requires only an extremely small amount of computation.

As recited in the appended claims, the environmental condition detection section 10 corresponds to lane boundary line recognition means and to object detection means, the vehicle condition quantity detection section 20 corresponds to vehicle condition detection means, the input section 30 corresponds to user or autonomous control system command receiving means, the obstacle registration section 41 of the data processing section 40 corresponds to obstacle registering means, the specific point setting section 42 of the data processing section 40 corresponds to specific point setting means, the travel path generating section 43 of the data processing section 40 corresponds to travel path generating means, the impassable location specifying section 44 of the data processing section 40 corresponds to impassable location specifying means, and the obstacle registration contents alteration section 45 of the data processing section 40 corresponds to obstacle registered contents alteration means.

What is claimed is:

1. A travel path generation apparatus for installation on a host vehicle, comprising:
    lane boundary line recognition means for identifying straight or curved lane boundary lines delimiting a traffic lane of the host vehicle;
    object detecting means for detecting objects located in an environment of the host vehicle;
    obstacle registering means for registering, as respective obstacles, the lane boundary lines identified by the lane boundary line recognition means and the objects detected by the object detecting means;
    specific point setting means for defining specific points at respective positions on the registered obstacles, the specific points being located at positions which must be avoided by the host vehicle;

travel path generating means for generating travel path information expressing a travel path for the host vehicle, the travel path generating means outputting the travel path as driving support for a driver of the host vehicle or driving support for implementing autonomous or semi-autonomous control of the host vehicle;

wherein the travel path comprises a path connecting successive mid-point positions between opposed pairs of the specific points, each of the pairs being respectively located on mutually opposed ones of the registered obstacles;

impassable location specifying means for specifying an impassable location as a location that is within the traffic lane of the host vehicle and is between a pair of opposed registered obstacles, and which cannot be traversed by the host vehicle, command receiving means for receiving a command from a user or from an autonomous or semi-autonomous control system of the host vehicle designating that the host vehicle is to follow a specific preceding vehicle, the specific preceding vehicle being a vehicle which avoids the at least one pair of opposed registered obstacles, and obstacle registration contents alteration means for responding to the command from the user or autonomous or semi-autonomous control system by deleting a specific one of the at least one pair of opposing registered obstacles from registration in the obstacle registering means, the specific registered obstacle being selected as a closer one of the pair of opposed registered obstacles to the specific preceding vehicle.

2. The travel path generation apparatus as claimed in claim 1 wherein:

the obstacle registering means registers, in place of each of the detected objects, a virtual object having external dimensions larger than external dimensions of the detected object, and registers the virtual object as an obstacle, and an extent to which the external dimensions of the virtual object are increased, in relation to the corresponding detected object, is determined in accordance with a type of the corresponding detected object.

3. The travel path generation apparatus as claimed in claim 1 wherein the command receiving means is further configured for receiving a second command from a user or from an autonomous or semi-autonomous control system of the host vehicle designating that a first one of the pair of opposed registered obstacles is to be driven over by the host vehicle, and the obstacle registration contents alteration means is further configured for responding to the reception of the second command by deleting the first one of the pair of opposed registered obstacles from registration in the obstacle registering means.

4. The travel path generation apparatus as claimed in claim 3, wherein the obstacle registration contents alteration means is further responsive to the reception of the second command for setting a virtual lane boundary line opposite a second one of the pair of opposed registered obstacles, the virtual lane boundary line being positioned for permitting the host vehicle to pass between the second one of the pair of opposed registered obstacles and the virtual lane boundary line.

5. The travel path generation apparatus as claimed in claim 4, wherein the obstacle registration contents alteration means sets the position of the virtual lane boundary line in accordance with a type of the second one of the pair of opposed registered obstacles.

6. The travel path generation apparatus as claimed in claim 4, further comprising means for detecting a condition quantity of the host vehicle, wherein the obstacle registration contents alteration means sets the position of the virtual lane boundary line in accordance with a condition of the host vehicle as expressed by the condition quantity.

7. The travel path generation apparatus as claimed in claim 3, wherein the impassable location specifying means specifies the impassable location as a location at which a separation distance between one of the at least one pair of opposed obstacles is less than a specific width value, the specific width value being a sum of a width of the host vehicle and a predetermined margin.

8. The travel path generation apparatus as claimed in claim 1, wherein the positions of the specific points constitute respective positions on a left-side boundary or a right-side boundary of the generated travel path, and wherein the specific point setting means determines the respective positions of the specific points in each of the opposed pairs of the specific points such as to maximize a separation between the left-side boundary and the right-side boundary.

9. The travel path generation apparatus as claimed in claim 1, wherein both the lane boundary lines and the detected objects are considered to be obstacles to be avoided when generating the travel path for the host vehicle.

10. The travel path generation apparatus as claimed in claim 9, wherein each of the obstacles specify regions which must not be entered by the host vehicle.

11. The travel path generation apparatus as claimed in claim 9, wherein each of the obstacles are defined as solid objects.

12. The travel path generation apparatus as claimed in claim 1, wherein the lane boundary lines are considered to be obstacles which define limits of regions which must not be entered by the host vehicle.

* * * * *